Patented Oct. 14, 1947

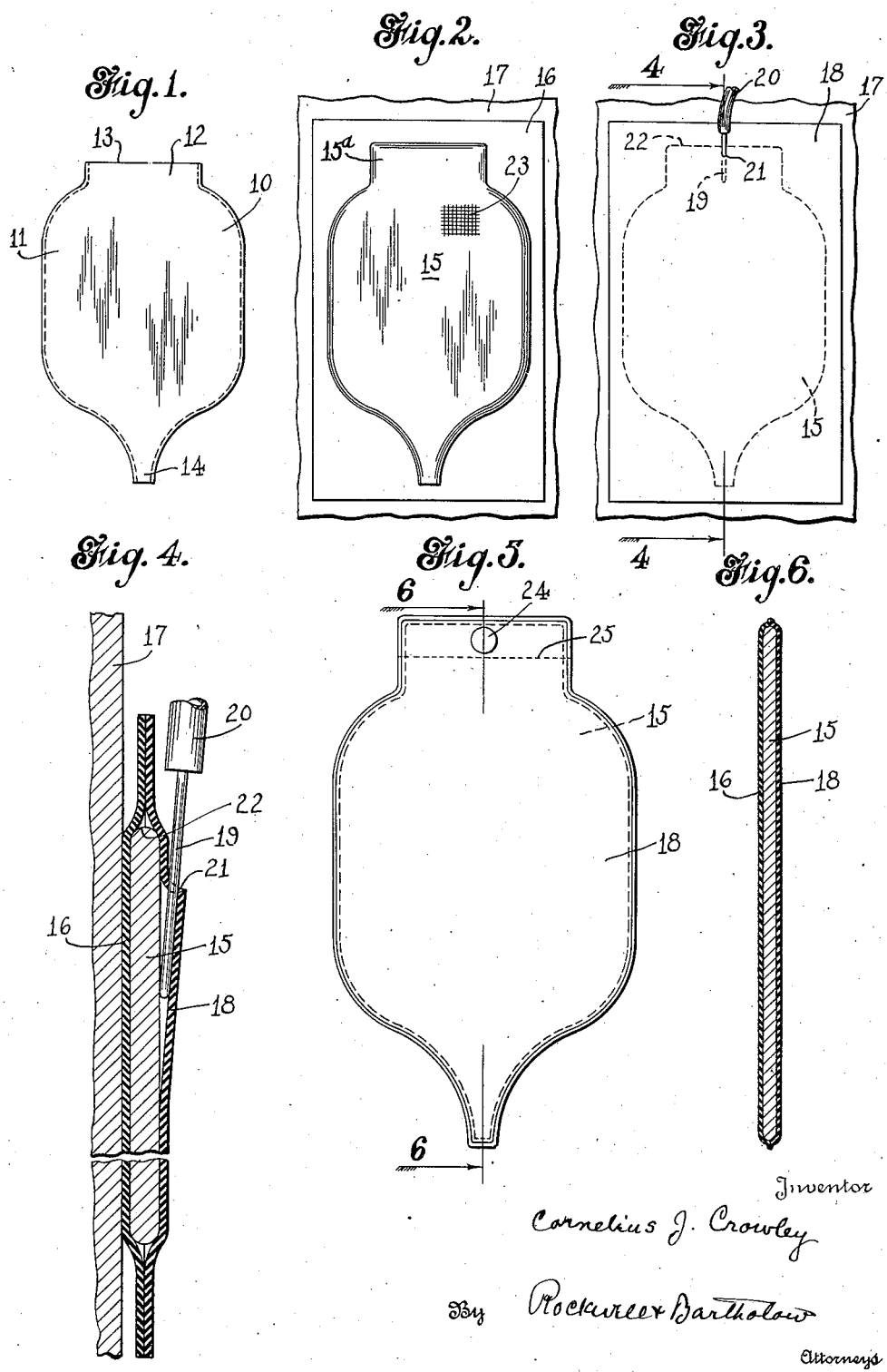

2,429,123

UNITED STATES PATENT OFFICE 2,429,123

METHOD OF MAKING RUBBER GOODS

Cornelius J. Crowley, New Haven, Conn., assignor to The Seamless Rubber Company, New Haven, Conn., a corporation of Connecticut Application February 17, 1945, Serial No. 578,439

7 Claims. (Cl. 18—56)

This invention relates to a method of making rubber goods, and more especially pouch-like articles such as water bags, fountain syringe bags, tobacco pouches and the like.

One of the objects of the invention is to provide a method by which the manufacture of articles of this general class is made quicker, easier and less expensive.

Another object is to provide a method of such a character that the apparatus required in the manufacture of the goods is simple and inexpensive.

Another object of the invention is to provide a method which in comparison to previous methods greatly speeds up production.

In the accompanying drawings:

Fig. 1 is an elevation of a syringe bag made by the improved method;

Fig. 2 is a view showing a step in the process of manufacture;

Fig. 3 is a view similar to Fig. 2 showing a later stage;

Fig. 4 is an enlarged section on line 4—4 of Fig. 3;

Fig. 5 is an elevation showing the blank after trimming; and

Fig. 6 is a section on line 6—6 of Fig. 5.

The method of the present invention is applicable to the manufacture of various articles of compounded rubber or rubber-like material and, in this description, the term "rubber" is used in a broad sense so as to include a rubber-like plastic material adapted to be cured or vulcanized. The method is applicable to the production of syringe bags, water bags, tobacco pouches and other articles which come under the designation of pouch-like articles. In the present instance, the process is described in connection with the manufacture of a syringe bag, but it will be understood that this is merely by way of example.

In the drawing, the completed syringe bag is shown at 10 in Fig. 1, and this particular article has a body 11 in the nature of a bag or receptacle provided at the upper end with a relatively wide neck 12 open at the upper end so as to provide a mouth portion 13 through which the bag may be filled. The neck portion can be reinforced, finished or trimmed in any manner desired. In the particular form shown, the completed syringe bag has at the lower end an extension 14 adapted to be equipped with a connecting nipple so as to permit the connection of the usual syringe tube, but this obviously is only a detail of the particular article selected for illustration. The syringe bag is a shallow flat article of which the wall is relatively thin so that the article is of relatively light weight.

In the manufacture of such an article, a form 15 such as shown in Fig. 2 is employed, this form being relatively flat and having a shape similar to that of the completed bag, although it will be noted by a comparison of Figs. 1 and 2 that the form has a longer or deeper neck portion than the completed bag. The neck portion of the form is shown at 15ª. The form 15 can advantageously be made of Bakelite or other material which is sufficiently rigid and can be easily molded or shaped and which will not be injured by the heat of vulcanizing. The form is relatively thin so as to be of a panel-like character, and the edge portions are preferably rounded over as indicated in the drawing.

In the manufacture of the article, a sheet 16 of uncured rubber stock is placed on a suitable support such as a table 17. The sheet 16 is then covered over at the upper side with a layer of rubber cement which can be readily applied, for example, by brushing it onto the sheet. The form 15 is then placed on top of the sheet in the manner shown in Fig. 2, leaving the marginal portions of the sheet exposed. The next step is to place a second sheet 18 of uncured sheet rubber over the form and over the first sheet in the manner shown in Fig. 3 so that that portion of the second sheet extending beyond the form can be adhesively connected to the underlying portion of the first sheet. The lateral or edge portions of the two sheets that extend beyond the form are adhesively interconnected all the way around the perimeter of the form in order that the latter may be enclosed in an airtight manner by the rubber covering.

The next step of the process is to remove the air from the interior of the blank, and this is preferably done by introducing a hollow suction needle 19 through the rubber wall and subjecting to suction the flexible tube 20 carrying the hollow needle. The needle is preferably introduced near the upper extremity of the blank, as shown in Figs. 3 and 4, so as to pierce the rubber wall at 21, at which point the needle causes a small hole to be created in the rubber wall. As will be noted from Fig. 4, the rubber wall which is penetrated is the wall which is outermost with reference to the table or support 17, and the point of penetration is near that margin 22 of the form which is at the upper end of the neck portion 15ª. It will also be noted from Fig. 4 that the needle enters the blank downwardly so as to have a portion of the needle alongside and against the face of the form.

With the parts in the position shown in Fig. 4, air is sucked out of the interior of the blank, and this causes the wall of uncured rubber to be drawn against and to conform to the form so that the rubber will be shaped to the form.

If desired, the rubber wall can be ornamented in this process by providing the form with a surface design as shown, for example, at 23 in Fig. 2, in which case the suction action will cause the rubber to be drawn into the cavities provided for ornamental purposes in the face of the form.

After the air has been exhausted from the interior of the blank, the needle is drawn out from the blank and the hole 21 closed in a suitable manner as by the application of a small piece 24 of uncured rubber. Thus air will be prevented from re-entering the blank. In this condition, the blank is left to "set" on the form, say for a few hours, in order to permit full conformity of the rubber wall to the external surface of the form.

The next step is to trim the blank so as to bring it to the condition shown in Fig. 5. Here the projecting marginal portions of the blank comprising the sheet portions adhesively joined in face-to-face relation have been cut adjacent the margin of the form so as to provide short flanges extending around the perimeter of the blank. Any suitable cutting knife or tool may be used in trimming.

The next step is to effect vulcanization, and this is usually done by placing the blank while still on the form in a location where it will be subject to the necessary heat during the necessary interval.

The next step is to remove the blank from the form, and this is done by opening the blank at the upper end (Fig. 5) and stripping it off of the form. In this operation the rubber blank is opened up in any suitable manner, for example, by slitting it with a knife blade or other suitable instrument in such a way that, with reference to Fig. 5, the blank can be pulled downwardly so as to remove it from the form. The line of slitting or cutting will be above the dotted line 25 in Fig. 5 because this dotted line represents the ultimate upper edge of the neck, and obviously that portion of the blank which will be a part of the final article should not be damaged. It is usually impractical to cut the blank with the ultimate cut at the neck margin in stripping the blank from the form, and usually a rough cut is effected for stripping purposes and the neck trimmed off at a later stage, that is, under conditions when it will be convenient to make a neat severance of the upper neck part of the blank from the lower neck part. This last-mentioned operation, as just indicated, will preferably be carried out after the blank has been stripped from the form. Following this operation, the blank can be finished or treated in any desired manner if necessary to provide a completed article of the kind desired.

In stripping the blank from the form, the blank will be turned inside out, and this will cause the flange at the edge of the blank to be directed inwardly, as indicated by the dotted lines in Fig. 1. It will also be apparent that if an ornamental design has been formed on the inner face of the blank in the suction process above described, the ornamented face will be presented at the outer side of the blank when the blank is reversed by stripping it off of the form.

It will be apparent from the foregoing description that the invention provides a process of manufacturing pouch-like rubber articles which is very simple and by which the manufacture of the goods can be materially speeded. The apparatus required for production, moreover, is simple and inexpensive and relatively few operations are required, and the required steps can be carried out in a satisfactory manner by workers who are not highly skilled. It is noted that in the process, the suction needle usually penetrates the blank in a marginal portion or extension which is later trimmed off but, nevertheless, the amount of scrap involved in this and in the trimming in general is quite small, and the scrap material can, of course, be reprocessed so as to appear eventually in finished articles. Where a design is impressed upon the blank, this will have sharp and clear definition, and the process of making an ornamented article is one of great simplicity.

I do not claim broadly herein the method of making shaped rubber articles which comprises providing a form having an external surface for shaping the rubber, applying over the form in general conformity thereto a blank of sheet rubber, sealing off a space defined at the outer side by the blank so that the blank will be shaped as the air in said space is exhausted, and exhausting the air from said space through a member introduced through the blank wall, as claimed in my application Serial No. 447,365, filed June 17, 1942. Neither do I claim broadly herein the method of making articles of rubber which comprises providing a rigid form, applying over the form in generally enclosing relation sheets of uncured rubber, interconnecting said sheets adhesively to create a rubber blank wholly enclosing the form, sucking the air out of the blank to thereby draw the rubber wall in the direction of the outer surface of the form for shaping it, and then opening up the blank and stripping it off of the form, as claimed in my application Serial No. 519,436, filed January 24, 1944.

While one article is shown in the drawing, it is understood that many different articles can be made by the process and that various changes in the procedure herein described in detail may be adopted without departure from the principles of the invention or the scope of the claims.

What I claim is:

1. The method of making pouch-like articles of rubber which comprises providing a rigid form, applying to the form sheets of uncured rubber in contacting relation to the form, interconnecting said sheets adhesively to create a blank wholly enclosing the form, sucking the air out of the blank to thereby draw the rubber wall against and shape it to the outer surface of the form, and then opening up the blank and stripping it off of the form, the air being sucked out of the blank by introducing a hollow suction member through the rubber wall in a part of the blank that is later trimmed off.

2. The method of making a pouch-like article of rubber which comprises applying sheets of uncured rubber to a rigid form, securing together the edges of the sheets so as to enclose the form in an airtight manner with the inner surfaces of the sheets opposed to the outer surface of the form, sucking the air out of the blank by a hollow instrument penetrating the rubber wall so that the rubber is shaped to the form, and then opening the blank and stripping it from the form.

3. The method of making a pouch-like article of rubber which comprises applying sheets of uncured rubber to a flat form at opposite sides, securing together the edges of the sheets throughout the perimeter of the form so as to enclose the latter in an airtight manner with the inner surfaces of the sheets opposed to the outer surface of the form, sucking the air out of the blank by a hollow instrument penetrating the rubber wall, vulcanizing, and then opening up the blank and stripping it from the form.

4. The method of making a pouch-like article of rubber which comprises applying sheets of uncured rubber to opposite faces of a flat rigid form, securing together the edges of the sheets throughout the perimeter of the form in order to enclose the form in an airtight manner, sucking the air out of the blank by a hollow instrument penetrating the rubber wall to thereby shape the rubber to the form, opening the blank at one portion and stripping it off of the form, and cutting the blank across the portion which has been opened.

5. The method of making a pouch-like article of rubber which comprises applying sheets of uncured rubber to opposite faces of a flat rigid form, securing together the edges of the sheets throughout the perimeter of the form in order to enclose the form in an airtight manner, sucking the air out of the blank by a hollow instrument penetrating the rubber wall to thereby shape the rubber to the form, opening the blank at one portion and stripping it off of the form, and cutting the blank across the portion which has been opened, the blank being vulcanized before it is stripped from the form.

6. The method of making a hollow plastic article open at one end which comprises providing a suitable form, enclosing said form in a covering of thermosetting sheet plastic material made up of different pieces secured together at their edges so that an entirely closed space is provided about the form with the inner surfaces of the pieces opposed to the outer surface of the form, exhausting the air from the closed space by the use of a hollow instrument penetrating the plastic wall in order to conform the covering to the form, curing the covering while on the form, and then opening up the covering adjacent the end which is to be open in the finished article and stripping it off of the form.

7. The method of making a shaped hollow rubber article which comprises providing a relatively rigid form having a shape approximating that of the finished article, applying over the form sheets of uncured rubber having surfaces adapted to contact surfaces of the form and extending marginally beyond the form, adhesively interconnecting the sheets in face-to-face relation at their marginal portions so as to create an airtight space in which the form is enclosed, exhausting the air from said space by means of a member introduced through the rubber wall, trimming the marginal portion of the blank, opening the blank, and stripping it from the form.

CORNELIUS J. CROWLEY.

REFERENCES CITED

The following references are of record in the file of this patent:

UNITED STATES PATENTS

| Number | Name | Date |
| --- | --- | --- |
| 2,354,916 | Hurt | Aug. 1, 1944 |
| 395,688 | Grundel | Apr. 27, 1943 |
| 2,203,072 | Albright | June 4, 1940 |
| 2,272,289 | Beal | Feb. 10, 1942 |
| 2,313,792 | Winder | Mar. 16, 1943 |